United States Patent
Schmid

(10) Patent No.: US 8,355,461 B2
(45) Date of Patent: Jan. 15, 2013

(54) METHOD AND DEVICE FOR THE NOISE SHAPING OF A TRANSMISSION SIGNAL

(75) Inventor: Andreas Schmid, Duisburg (DE)

(73) Assignee: Intel Mobile Communications GmbH, Neubiberg (DE)

(*) Notice: Subject to any disclaimer, the term of this patent is extended or adjusted under 35 U.S.C. 154(b) by 658 days.

(21) Appl. No.: 12/481,506

(22) Filed: Jun. 9, 2009

(65) Prior Publication Data
US 2010/0054363 A1    Mar. 4, 2010

(30) Foreign Application Priority Data
Aug. 28, 2008 (DE) .................... 10 2008 044 744

(51) Int. Cl.
*H04K 1/02* (2006.01)
*H04L 25/03* (2006.01)
*H04L 25/49* (2006.01)

(52) U.S. Cl. .................... 375/296; 375/295; 327/291

(58) Field of Classification Search .................... 375/296
See application file for complete search history.

(56) References Cited

U.S. PATENT DOCUMENTS

| | | |
|---|---|---|
| 2003/0210746 A1 | 11/2003 | Asbeck et al. |
| 2004/0146168 A1* | 7/2004 | Goubran et al. ............ 381/73.1 |
| 2005/0105594 A1* | 5/2005 | Giannakis et al. ........... 375/132 |
| 2005/0265481 A1 | 12/2005 | Bellaouar et al. |
| 2005/0287964 A1 | 12/2005 | Tanaka et al. |
| 2006/0119493 A1 | 6/2006 | Tal et al. |
| 2006/0203922 A1 | 9/2006 | Rezeq |
| 2008/0084921 A1* | 4/2008 | Hsieh et al. ................... 375/150 |
| 2008/0219466 A1* | 9/2008 | Pishehvar et al. ............ 381/73.1 |
| 2008/0317167 A1* | 12/2008 | Boos et al. .................... 375/296 |

FOREIGN PATENT DOCUMENTS

| | | |
|---|---|---|
| EP | 1858216 A1 | 11/2007 |
| WO | WO03052938 A2 | 6/2003 |
| WO | WO03077489 A1 | 9/2003 |

OTHER PUBLICATIONS

See CDMA Online, available at http://www.cdmaonline.com/interactive04/workshops/terms1/1008.htm, last visited Oct. 2, 2011.*

* cited by examiner

*Primary Examiner* — Erin File
(74) *Attorney, Agent, or Firm* — Eschweiler & Associates, LLC

(57) ABSTRACT

A description is given of a device and a method for the noise shaping of a transmission signal such as are employed, for example, in a data transmission system.

14 Claims, 8 Drawing Sheets

US 8,355,461 B2

METHOD AND DEVICE FOR THE NOISE SHAPING OF A TRANSMISSION SIGNAL

CROSS-REFERENCE TO RELATED APPLICATIONS

This application claims priority from German Patent Application No. 102008044744.7, which was filed on Aug. 28, 2008, and is incorporated herein in its entirety by reference.

BACKGROUND

In a communication system, a transmitting device serves for converting a useful signal into an output signal. For this purpose, the output signal is modulated in a manner dependent on the information contained in the useful signal. The modulated output signal is transmitted as transmission signal via a communication channel, such as, for example, via a data cable or a radio channel. In a receiver, the received transmission signal is demodulated and the information of the original useful signal is provided in a form that enables further signal processing.

In the communication channel, the transmission signal is disturbed by a multiplicity of influences. The latter include already a thermal noise present in the transmitting device. Other transmission signals on the communication signal or interference signals from electrical apparatuses are likewise responsible for any disturbance or degradation of the transmission signal. An additional factor is attenuation of the transmission signal by a spatial separation of transmitting device and receiver. For a successful transmission of the information contained in the useful signal, the output signal must have a signal level that is large enough in order that the received transmission signal can be processed by the receiver.

Modern communication systems, and here in particular wireless communication systems, have a large dynamic range for the signal level. This is the case for amplitude-modulated transmission systems, inter alia. One example is a communication system defined in accordance with the so-called Universal Mobile Telecommunication Standard (UMTS). Another example thereof is the so-called High Speed Uplink Packet Access (HSUPA) Standard.

The dynamic range for an amplitude-modulated transmission system is illustrated below. The RMS power (Root-Mean-Square power) of the transmitting device is used to specify the average power of the transmitting device without interference or overdriving. In a UMTS or HSUPA system, said power, in relation to a minimum required output power, is approximately 35-40 dB. In addition, various requirements imposed by the standards on a power level of a transmitter give rise to a further adjustment range of up to 80 dB. The total dynamic range of the transmitter is therefore approximately 115-120 dB.

In a known transmitting device, an amplifier unit is provided for providing the required output power. Thus, in a polar transmitter architecture, for example, the setting of the output power is effected in the amplitude branch of the transmitter. If appropriate, a further setting is effected by adjusting an operating point of an amplifier in the phase branch of the transmitter, for example by adjusting a DC voltage or bias voltage of a transistor. For the case of a so-called polar modulator architecture, the power can likewise be implemented by means of a setting of the output power in the amplitude branch of the transmitter. If appropriate, a further setting is provided by a preamplification by means of a control amplifier or Variable Gain Amplifier (VGA). In this case, obtaining a high dynamic range is associated with particular expenditure. By way of example, the setting of the output power with the use of a VGA requires an additional control of the temperature response of the VGA.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Figure 1:
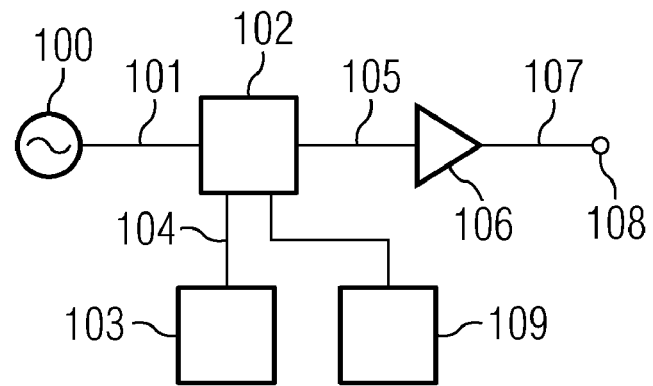
FIG. 1 shows a schematic illustration of an embodiment of the device according to the present disclosure for generating a transmission signal.

The present disclosure relates to providing a method and a device for generating a transmission signal whose signal level can be set with low expenditure.

One embodiment of the method according to the present disclosure involves generating a first signal with a first frequency spectrum, which has a carrier frequency. A power information signal is provided, which represents information about a signal level of the transmission signal. Furthermore, a sequence signal is provided. The first signal is shaped in a manner dependent on the power information signal and the sequence signal to form a second signal, which has noise components in at least one frequency range away from the carrier frequency. The second signal is provided as transmission signal.

One embodiment of the device according to the present disclosure comprises a signal generator for generating a first signal with a first frequency spectrum, which has a carrier frequency. A power control unit for providing a power information signal, which represents information about a signal level of the transmission signal, is provided. A sequence generator for providing a sequence signal is provided. Furthermore, a first signal shaper for the noise shaping of the first signal in a manner dependent on the power information signal and the sequence signal to form a second signal, which has noise components in at least one frequency range away from the carrier frequency, is provided. Furthermore, the embodiment comprises a signal output for providing the second signal as transmission signal.

The noise shaping of the first signal to form a second signal is used to shift power components from the carrier frequency into a sideband. The sideband comprises at least one frequency range away from the carrier frequency. The carrier frequency is therefore not included in the frequency range. A control of the signal level is thus carried out by shifting components from the carrier frequency into the sideband. The amplitude of the second signal at the carrier frequency is reduced by the shifted component. The higher the said component, the greater the attenuation of the signal at the carrier frequency.

In some-for example spread-coded transmission systems, such as a Code Division Multiple Access (CDMA) transmission system-further carrier frequencies are provided, which can also form a carrier frequency band. In such systems, the frequency range is arranged outside the carrier frequency band in an analogous manner.

In one embodiment of the present disclosure, at least part of the setting of the signal level is effected at an oscillator signal, for example, at a local oscillator or in a phase path of a transmitting device. This is particularly advantageous for use in a phase-modulated transmission system. A higher signal level of the oscillator signal reduces a cross talk of the latter and the phase modulation with signals on an antenna.

The noise shaping obviates adaptation of the amplitude of the second signal over the entire frequency spectrum. The amplitude is controlled only with regard to the carrier frequency. However, the second signal remains unchanged for example with regard to its peak-to-peak voltage. Consequently, in an advantageous manner in the case of an amplitude modulation the requirements made of the level adjustment in an amplitude path of the transmitting device are lessened. By feeding in the sequence signal, it is possible for the spectral distribution of the transmission signal to be configured in a particularly efficient manner. In particular, spurious emissions can be suppressed in this way. A high spectral purity of the transmission signal is thus obtained.

By providing a sequence signal, it is possible to suppress the arising of spurious emissions during the noise shaping. In this case, the sequence signal is a digital or discrete signal, for example, which can be chosen in a manner dependent on the desired application.

In this case, the spurious emissions can be suppressed in such a way that the second signal has a spectrum corresponding to the spectral mask of a transmission signal that is predetermined in a transmission standard. It is thus possible, in particular, to dispense with subsequent filtering of the transmission signal prior feeding into a transmission channel. A device for transmitting data signals can thus dispense with an output filter. This constitutes a considerable advantage, particularly in the case of transceiver architectures for mobile radio. The output filter for shaping the spectral mask is usually a separate component provided in addition to the transceiver component. In the case of architectures designed for emitting transmission signals on different frequency bands, it is often necessary for a plurality of output filters to be provided. Dispensing with output filters thus constitutes an important cost saving for manufacturers of terminals.

Therefore, the sidebands of the second signal, or of the transmission signal, are made as flat as possible by the sequence signal. The spectrum of the transmission signal is shaped in such a way that a standard-conforming spectral mask is complied with.

FIG. 1 shows a schematic illustration of an embodiment of the device according to the present disclosure for generating a transmission signal. The device has a signal generator 100 for generating a first signal with a first frequency spectrum, which comprises a carrier frequency. The signal generator 100 is connected to a first signal shaper 102 via a first signal line 101. The device furthermore comprises a power control unit 103. The power control unit 103 is connected to the first signal shaper 102 via a second signal line 104. A power information signal is provided or communicated to the first signal shaper 102 from the power control unit 103 via the second signal line 104.

In addition, the device has a sequence generator 109, which is connected to the first signal shaper 102 via a fifth signal line 110. The sequence generator 109 provides a sequence signal, which is fed to the signal shaper 102 via the third signal line 110.

The first signal shaper 102 carries out a noise shaping of the first signal to form a second signal in a manner dependent on the power information signal. The second signal is generated by the first signal shaper 102 by shifting components of the first signal from the carrier frequency into a frequency range away from the carrier frequency. The second signal thus has noise components in at least one frequency range away from the carrier frequency. A proportion of the signal energy of the first signal is shifted into a noise band. The signal power at the carrier frequency is reduced.

The power information signal represents a signal level of the transmission signal. This signal level can correspond to a peak power of the transmission signal. It is likewise possible for the signal level to vary in a manner dependent on information about an amplitude modulation. A change in the signal level in a manner dependent on an amplitude modulation will usually take place on significantly smaller timescales, that is to say at higher frequencies, than a change in the peak power of the transmission signal.

The sequence signal is a bit sequence determined in such a way that the transmission signal has a spectrum with a low signal level on the sidebands. For this purpose, the sequence signal can be a sequence of random numbers, or it can be derived from a sequence of random numbers. The mean value of the random numbers is typically zero. The sequence of random numbers likewise has a spectrum, corresponding for example to white noise. This is the case, in particular, if successive random numbers are not correlated with one another.

In one embodiment of the sequence generator, a sequence of random numbers is generated from a random number generator that calculates so-called pseudo-random numbers. In this case, there is a correlation between the numbers in the sequence, wherein the correlation is dependent on the distance between two numbers in the sequence. The sequence of random numbers thus exhibits a form of memory. The correlation of the sequence elements has the effect that the spectrum of the random numbers assumes a specific shape. The noise described by the random numbers deviates from white noise.

With knowledge of these properties of random numbers it is possible for the person skilled in the art to choose the sequence signal in such a way that a desired spectral shape of the transmission signal is achieved.

The first signal shaper 102 is connected to an amplifier unit 106 via a third signal line 105. The second signal is provided to the amplifier unit 106 from the first signal shaper 102 via the third signal line. The amplifier unit 106 is connected to an output 108 via a fourth signal line 107. It amplifies the second signal and thus provides a transmission signal at the output 108.

The amplifier unit 106 can be a programmable amplifier, a so-called programmable gain controlled amplifier or PGC. In other exemplary embodiments, the amplifier unit 106 is an output stage in the form of a power amplifier or PA. The PA can be operated as a switching amplifier or as a linear amplifier.

Figure 2:
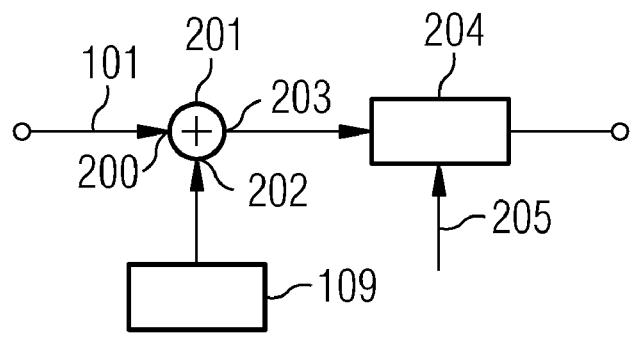
FIG. 2 shows a schematic illustration of an embodiment of a signal shaper in a device for generating a transmission signal.

FIG. 2 shows a schematic illustration of an embodiment of a signal shaper in a device for generating a transmission signal. The signal shaper has a first signal line 101, via which a first signal with a first frequency spectrum can be fed in. The first signal line 101 is connected to a first input 200 of an adder 201. A second input 202 of the adder 201 is connected to a sequence generator 109. The sequence generator 109 generates a sequence signal, which is provided analogously to the sequence signal of the embodiment in FIG. 1. The first signal and the sequence signal are added to one another in the first adder 201. A corresponding summation signal is provided at an output 203 of the adder 201. The output 203 is connected to a signal noise shaper 204 via a line. The signal noise shaper 204 can be a delta-sigma modulator, for example. A control signal is fed to the signal noise shaper 204 via a control input 205, for example in the form of a so-called "gain value" for regulating a gain of the summation signal by means of the signal noise shaper 204.

A transmission signal generated by the signal noise shaper 204 is provided at an output 206 of the signal shaper.

Figure 3:
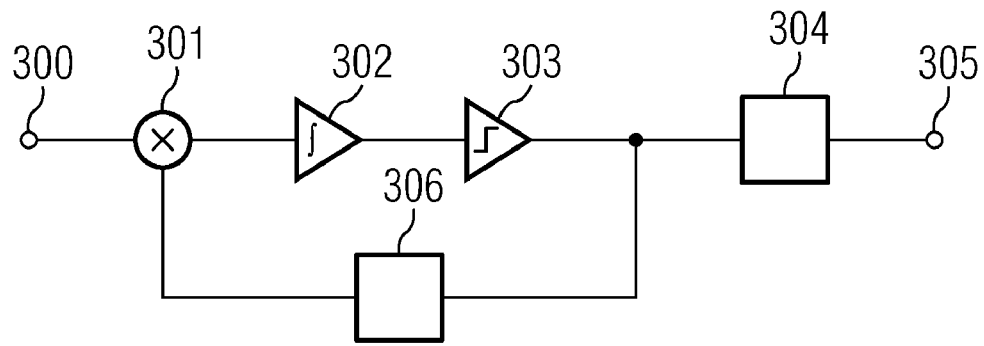
FIG. 3 shows a schematic illustration of a delta-sigma modulator.

FIG. 3 shows a schematic illustration of a delta-sigma modulator. The delta-sigma modulator has an input 300, via which a first signal to be modulated is fed in. The input 300 is connected to a multiplier 301. On the output side, the multiplier 301 is connected to an integrating element 302. The integrating element 302 is connected to a limiting element 303. It is clocked by a clock signal fed in externally and with each clock signal sums a first data word provided by the multiplier 301 and provides the sum to the limiting element 303. The latter limits the value of the sum. On the output side, the limiting element 303 is connected to an output 305 via a filter 304 and to the multiplier 301 via a feedback path. A digital-to-analog converter 306 is arranged in the feedback path. In accordance with the filter characteristic of the filter 304, the delta-sigma converter is a low-pass, high-pass or band-pass delta-sigma converter.

Figure 4:
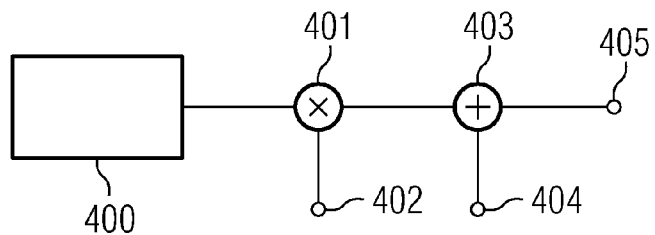
FIG. 4 shows a schematic illustration of an embodiment of a sequence generator in a device for generating a transmission signal.

FIG. 4 shows a schematic illustration of an embodiment of a sequence generator in a device for generating a transmission signal. The sequence generator has a random number generator 400, which generates a sequence of random numbers or pseudo-random numbers. The random number generator 400 is connected to a first input of a multiplier 401. A second input of the multiplier 401 is connected to a first control input 402. A first control signal is fed in at the first control input 402. With the first control signal, the sequence of random numbers is scaled by multiplication in 401. This can be achieved for example by means of a first control signal that is substantially constant over time. Depending on the requirement, the first control signal can vary over time, wherein a time scale for the change in the first control signal can be smaller or larger than a characteristic time scale of the random numbers. A characteristic time scale of the random numbers can be defined for example by means of a noise spectrum of the random numbers.

Consequently, scaled random numbers are provided by the multiplier 401. The scaled random numbers are fed to a first input of an adder 403. A second input of the adder 403 is connected to a second control input 404. A second control signal is provided at the second control input 404. A mean value (offset) of the scaled random numbers can be adjusted with the second control signal. This can be achieved for example by means of a second control signal that is substantially constant over time. Depending on the requirement, the second control signal can vary over time, wherein a time scale for a change in the second control signal can be smaller or larger than the characteristic timescale of the random numbers. An output of the adder 403 is connected to an output 405, at which the sequence signal generated is provided.

Figure 5:
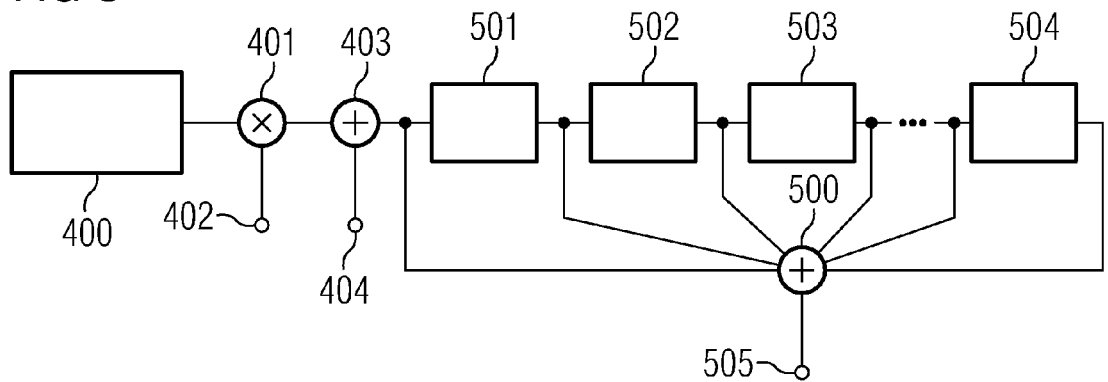
FIG. 5 shows a schematic illustration of a second embodiment of a sequence generator in a device for generating a transmission signal.

FIG. 5 shows a schematic illustration of a second embodiment of a sequence generator in a device for generating a transmission signal. The embodiment is identical in essential elements to the embodiment in FIG. 4. It likewise has the random number generator 400, the multiplier 401 and the adder 403, with the aid of which the sequence of random numbers can be scaled and shifted by a constant value in terms of its mean value. The first control input 402 for providing the first control signal and the second control input 404 for providing the second control signal are equally provided for this purpose. However, in contrast to the exemplary embodiment in FIG. 4, the output of the adder 403 is connected to a first input of a multi-adder 500. Furthermore, said output is connected to a series circuit comprising a plurality of delay elements 501, 502, 503, . . . , 504. The outputs of each of the delay elements 501, 502, 503, . . . , 504 are connected to a respective input of the multi-adder 500. An output of the multi-adder 500 is connected to an output 505, at which the sequence signal generated is provided.

In this way, a certain memory is obtained in the random sequence. The random values are not decorrelated over time and in this way the spectrum of the random numbers can further be designed in accordance with the desired spectral mask. The number of delay elements 501, 502, 503, . . . , 504 typically assumes a value of 3 to 10. However, it is also conceivable for the number of delay elements 501, 502, 503, . . . , 504 used by the signal generator to be variably adjustable e.g. by the use of multiplexers or switches. The delay elements 501, 502, 503, . . . , 504 and the multi-adder 500 form one possible embodiment of a circuit for impressing a memory term on the sequence signal.

Figure 6:
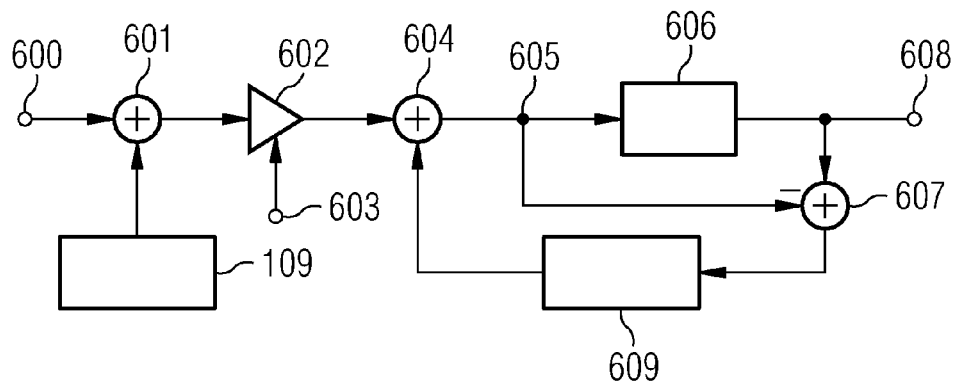
FIG. 6 shows a schematic illustration of a second embodiment of a signal shaper in a device for generating a transmission signal.

FIG. 6 shows a schematic illustration of a second embodiment of a signal shaper in a device for generating a transmission signal. The signal shaper has an input 600, via which a first signal is fed in, for example a carrier frequency signal or a phase-modulated carrier frequency signal. The input 600 is connected to an amplifier 602 via a first adder 601. On the input side, the first adder 601 is furthermore connected to a sequence generator 609, which generates a sequence signal in accordance with the teaching described above. A carrier signal added to the sequence signal is thus fed to the amplifier 602. The amplifier 602 amplifies this signal in a manner dependent on a gain or attenuation factor provided at a control input 603. The amplified signal is fed to a second adder 604, where it is added to a feedback signal. The output of the second adder 604 is connected via a node 605 to a device 606 for determining a sign of the output signal. The device 606 for determining a sign of the output signal is connected, on the output side, to a third adder 607 and an output 608 of the signal shaper. An inverted signal of the node 605 is also fed to the third adder 607. The output of the third adder 607 is connected via a delay element 609 to the second adder 604, in order to feed the feedback signal to the latter.

Figure 7:
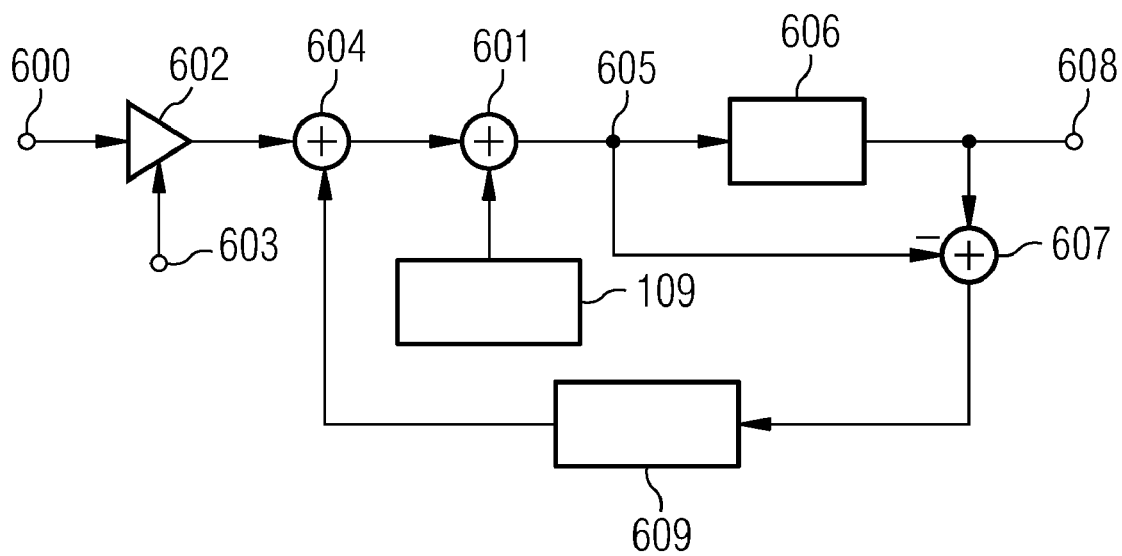
FIG. 7 shows a schematic illustration of a third embodiment of a signal shaper in a device for generating a transmission signal.

FIG. 7 shows a schematic illustration of a third embodiment of a signal shaper in a device for generating a transmission signal. FIG. 7 differs from FIG. 6 in that the first adder 601 here is arranged between the second adder 604 and the node 605 rather than between the input 600 and the amplifier 602.

Figure 8:
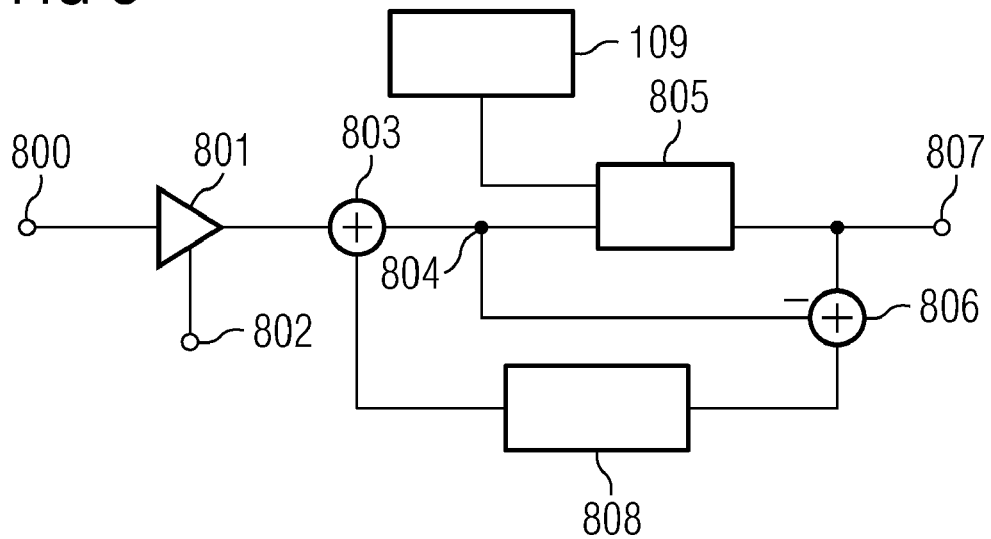
FIG. 8 shows a schematic illustration of a fourth embodiment of a signal shaper in a device for generating a transmission signal.

FIG. 8 shows a schematic illustration of a fourth embodiment of a signal shaper in a device for generating a transmission signal. The signal shaper has an input 800, via which a first signal is fed in, for example a carrier frequency signal or a phase-modulated carrier frequency signal. The input 800 is connected to an amplifier 801. The amplifier 801 amplifies this signal in a manner dependent on a gain or attenuation factor provided at a control input 802. The amplified signal is fed to a first adder 803, where it is added to a feedback signal. The output of the first adder 803 is connected to a comparison device 805 via a node 804. On the input side, the comparison device 805 is furthermore connected to a sequence generator 109. In the comparison device 805, the output signal of the first adder 803 is compared bit-by-bit with a sequence signal of the sequence generator 109. The sequence signal is generated by the sequence generator 109 in accordance with the teaching described above. On the output side, the comparison device 805 is connected to a second adder 806 and an output 807 of the signal shaper. An inverted signal of the node 804 is also fed to the second adder 806. The output of the second adder 806 is connected via a delay element 808 to the first adder 803 in order to feed the feedback signal to the latter.

Figure 9:
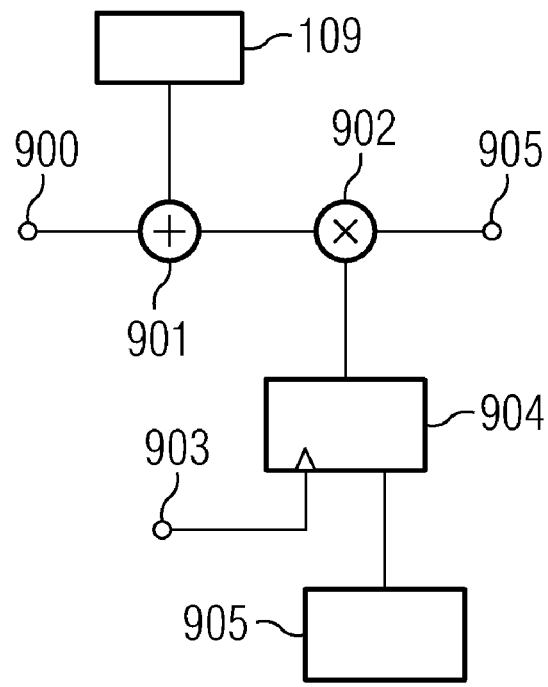
FIG. 9 shows a schematic illustration of a fifth embodiment of a signal shaper in a device for generating a transmission signal.

FIG. 9 shows a schematic illustration of a fifth embodiment of a signal shaper in a device for generating a transmission signal. The signal shaper has an input 900, via which a first signal is fed in, for example a carrier frequency signal or a phase-modulated carrier frequency signal. The first input 900 is connected to a multiplier 902 via an adder 901. On the input side, the adder 901 is furthermore connected to a sequence generator 109, which generates a sequence signal in accordance with the teaching described above. The signal shaper furthermore has a second input 903, via which a clock signal is fed in. The second input 903 is connected to a delta-sigma modulator 904, which is clocked by the clock signal. On the input side, the delta-sigma modulator 904 is coupled to a power control value unit 905, via which a power information signal is fed to the delta-sigma modulator 904. From the power information signal, the delta-sigma modulator 904 generates a first bit stream. On the output side, the delta-sigma modulator 904 is connected to the multiplier 902. In the multiplier 902, the first signal is multiplied by the first bit stream, with the result that a second bit stream arises. On the output side, the multiplier 902 is connected to an output 906, at which the second bit stream is provided. In this case, the frequency of the clock signal can be greater than the carrier frequency. An oversampling of the power information signal is thereby obtained. The frequency range away from the carrier frequency into which components of the first signal are shifted as noise components thereby becomes wider. This can advantageously have the effect of enabling parasitic capacitances to be used for the reconstruction filter.

Figure 10:
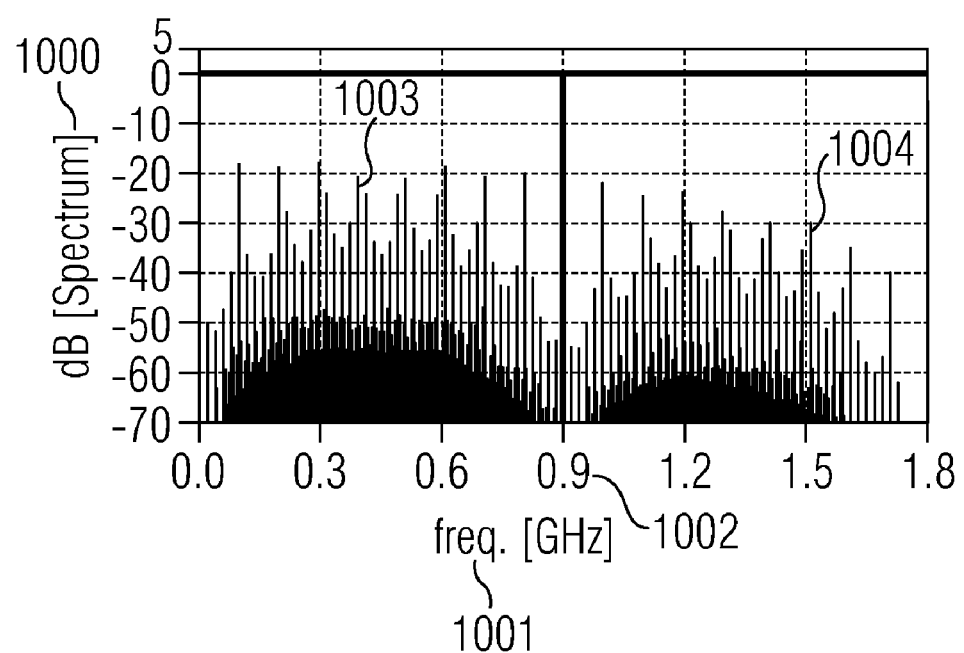
FIG. 10 shows an exemplary illustration of a spectrum of the first signal without the introduction of a sequence signal.
Figure 11A:
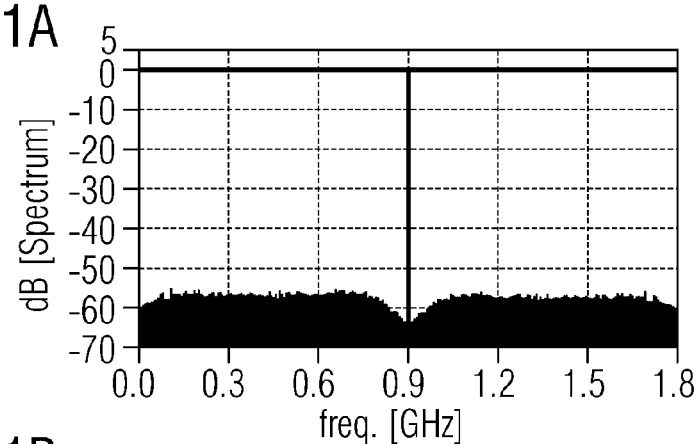
FIG. 11a to FIG. 11h show exemplary illustrations of a spectrum of the second signal at an output of the first signal shaper in the case of various sequence signals.
Figure 11B:
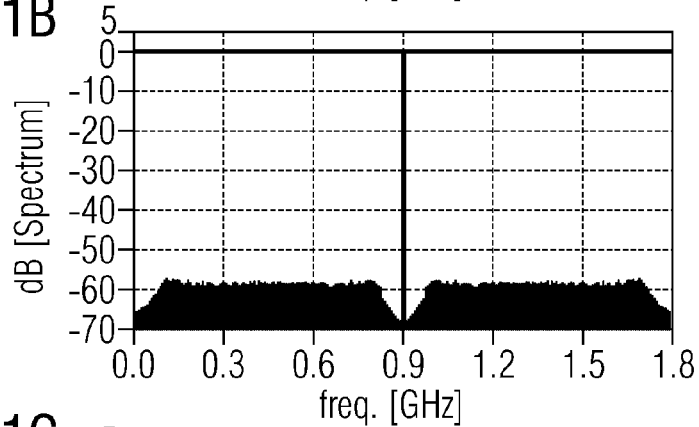
Figure 11C:
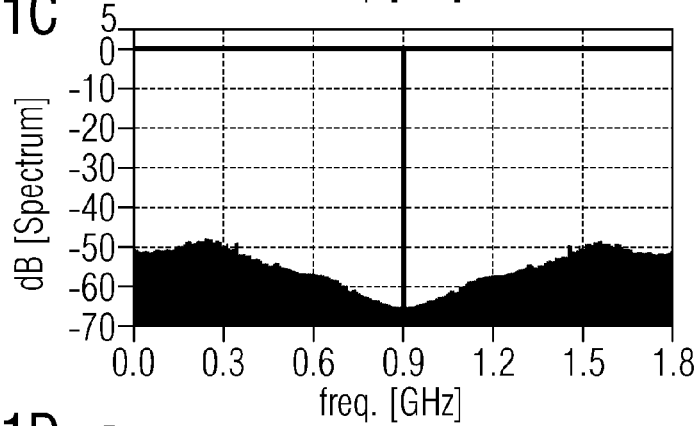
Figure 11D:
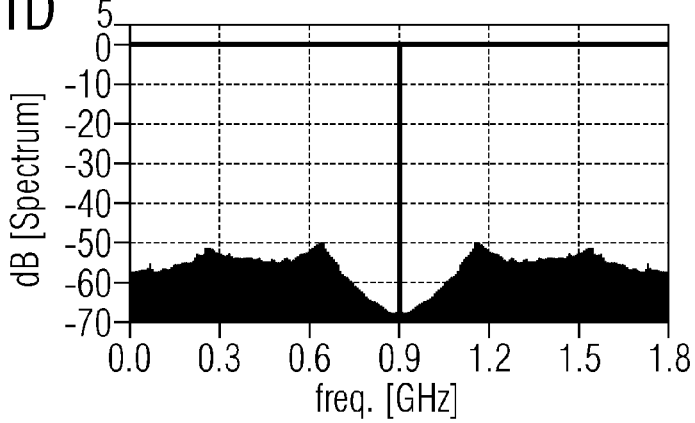
Figure 11E:
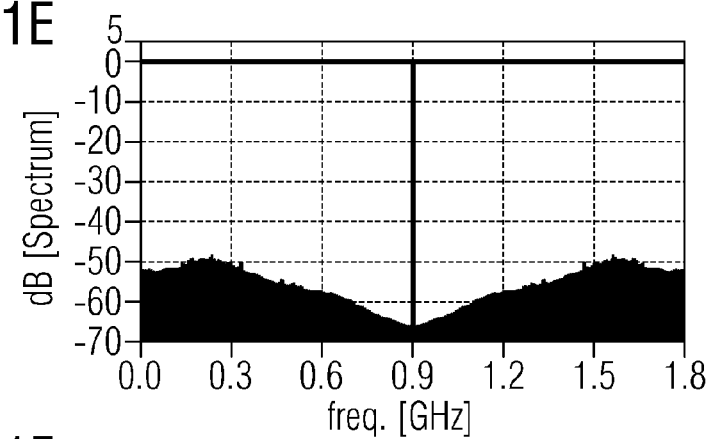
Figure 11F:
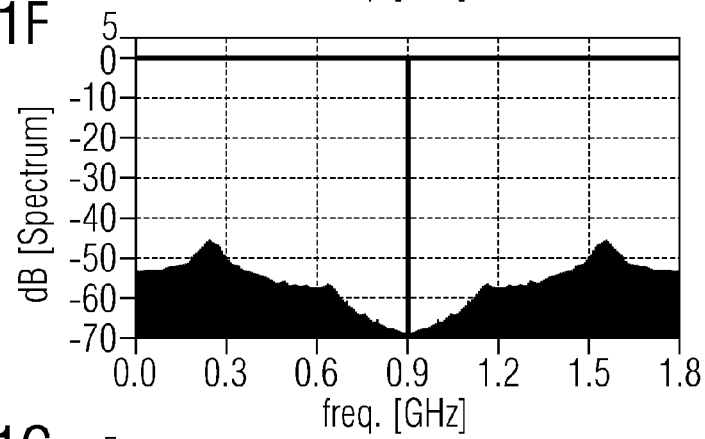
Figure 11G:
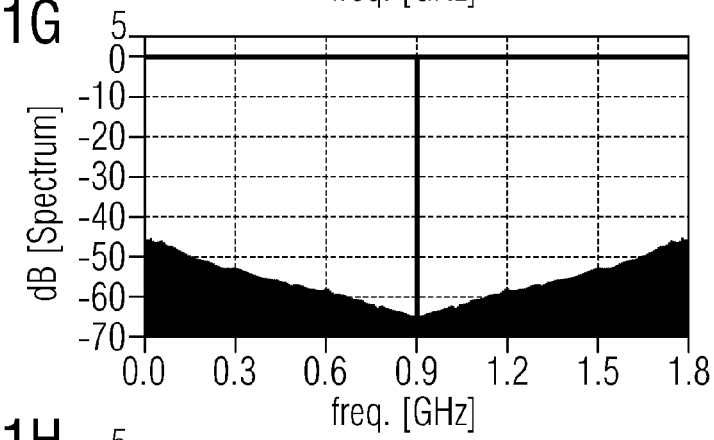
Figure 11H:
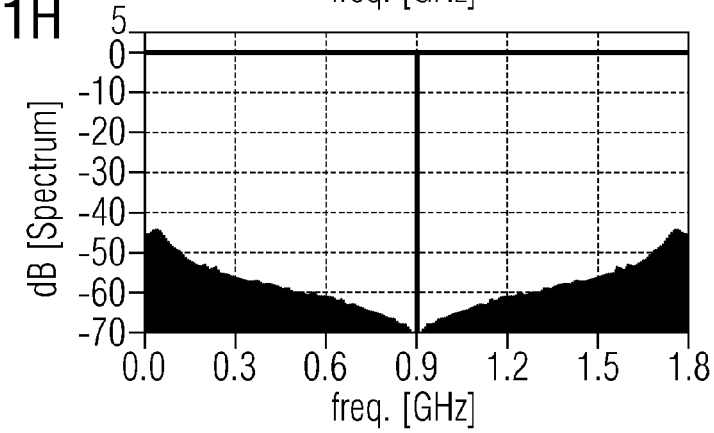

FIG. 10 shows an exemplary illustration of a spectrum of the first signal without the introduction of a sequence signal. In this case, on an ordinate 1000 a power level in decibels (dB) of the output power of a signal generator 100 is plotted against an abscissa 1001. The abscissa 1001 extends over a frequency band that is specified from 0 GHz to 1.8 GHz, by way of example. In the exemplary embodiment shown, the signal generator 100 generates a carrier frequency 1002 of approximately 900 MHz, which corresponds to a transmission frequency in a frequency band of a GSM system, of a GSM EDGE system, of a UMTS system or of a UMTS HSUPA system. In the spectrum shown, the frequency generator generates a first signal, which is provided on the first signal line 101 and the signal energy of which is concentrated on the carrier frequency 1002. The spectrum correspondingly has a sharp peak of the power level at the carrier frequency 1002. However, thermal noise, manufacturing inaccuracies, etc., often give rise to a widening of the peak or noise components away from the carrier frequency 1002. These can clearly be discerned by means of wide secondary spectra 1003, 1004.

FIG. 11*a* to FIG. 11*h* show exemplary illustrations of a spectrum of the second signal at an output of the first signal shaper in the case of various sequence signals. It can be discerned that the peaks of the secondary spectra depending on a suitable choice of the sequence signal, in relation to the spectrum in FIG. 10, are decreased significantly, that is to say by up to 50 dB. In this way it is possible to suitably manipulate the signal on the carrier frequency without necessitating an output filter, since the desired spectral mask can be complied with or generated as desired.

Embodiments of the device according to the present disclosure for generating a transmission signal can be arranged in a transmitting device, in particular. The transmitting device can thus be implemented in a considerably simpler manner.

Figure 12:
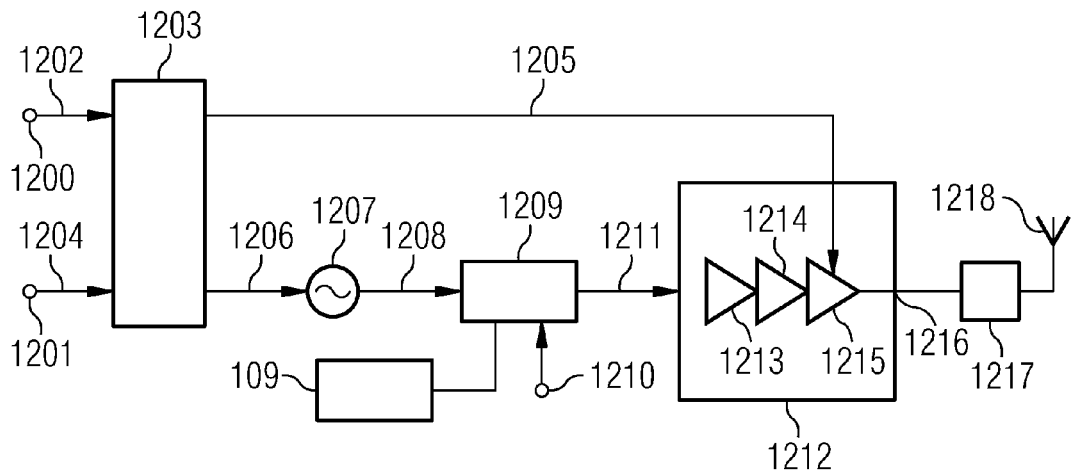
FIG. 12 shows a schematic illustration of a polar modulator embodiment of the transmitting device.

FIG. 12 shows a schematic illustration of a polar modulator embodiment of the transmitting device. The transmitting device has a first input 1200 for feeding in an in-phase component of a useful signal comprising an item of information to be transmitted. The transmitting device furthermore has a second input 1201 for feeding in a quadrature component of the useful signal. The first input 1200 is connected to a transformation unit 1203 via a first signal line 1202. The second input 1201 is connected to the transformation unit 1203 via a second signal line 1204.

The quadrature-modulated input signals are provided by a baseband-processing device (not illustrated in FIG. 12). Said device comprises in various embodiments a microprocessor or a logic switching mechanism such as e.g. a micro-controller or DSP. The baseband-processing device can be arranged on the same semiconductor component as the transmitting device or separately. Different partitionings on different components are likewise conceivable.

From the in-phase component fed in and the quadrature component fed in, the transformation unit 1203 determines a representation of the useful signal in polar coordinates. It provides an amplitude component of the useful signal on a third signal line 1205 and a phase component of the useful signal on a fourth signal line 1206.

The transformation unit 1203 is connected to a phase modulator 1207 via the fourth signal line 1206. The phase modulator 1207 modulates the phase component onto a carrier frequency, that is to say onto a transmitting frequency of the transmitting device. For this purpose, the phase modulator 1207 can be designed as a digital or analog phase-locked loop, PLL. At the output of the phase modulator 1207, a first signal is provided on a fifth signal line 1208. The phase modulator 1207 is connected to a first signal shaper 1209 via the fifth signal line 1208. The signal shaper 1209 is connected to a sequence generator, which feeds a sequence signal to said signal shaper, said sequence signal being established in the manner described above on the basis of a number of exemplary embodiments. The first signal shaper 1209 is furthermore connected to a third input 1210. A power information signal is provided at the third input 1210. In a manner dependent on the power information signal, the first signal shaper 1209 carries out noise shaping of the first signal to form a second signal, which has noise components in at least one frequency range away from the carrier frequency. The second signal is provided on a sixth signal line 1211 by the first signal shaper 1209. The first signal shaper 1209 is connected to a multistage amplifier unit 1212 via the sixth signal line 1211.

The multistage amplifier unit 1212 has a first amplifier stage 1213, a second amplifier stage 1214 and an output amplifier stage 1215. The output amplifier stage 1215 is connected to the transformation unit 1203 via the third signal line 1205. The amplitude component is fed to the output amplifier stage 1215 via the third signal line 1205. The second signal is amplified in the multistage amplifier unit 1212, wherein the gain factor of the output amplifier stage 1215 is adjusted by means of the amplitude component. This can be effected for example by setting the supply voltage or the operating point of the output amplifier stage 1215 in a manner dependent on the amplitude component. In this way, the amplitude component is modulated onto the second signal in the output amplifier stage 1215. An amplitude- and phase-modulated third signal is thus provided at an amplifier output 1216 of the multistage amplifier unit 1212.

The amplifier output 1216 is connected to an antenna 1218 via a second signal shaper 1217. The second signal shaper 1217 is configured as a band-pass filter, for example, which has a midband frequency at or in the vicinity of the carrier frequency. The second signal shaper 1217 suppresses at least signal components of the third signal in the frequency range away from the carrier frequency. The second signal shaper 1217 can also be referred to as a "reconstruction filter". Owing to the provision of the sequence generator 109, however, the second signal shaper 1217 is optional and can be omitted given a suitable choice of sequence signal.

Consequently, the signal emitted via the antenna 1218 has a spectrum in which the signal energy is concentrated around the transmission frequency, while noise components on sidebands are suppressed. Such an architecture can be adapted particularly efficiently to spectral requirements which are imposed on the transmitting device by a transmission standard, for example.

Figure 13:
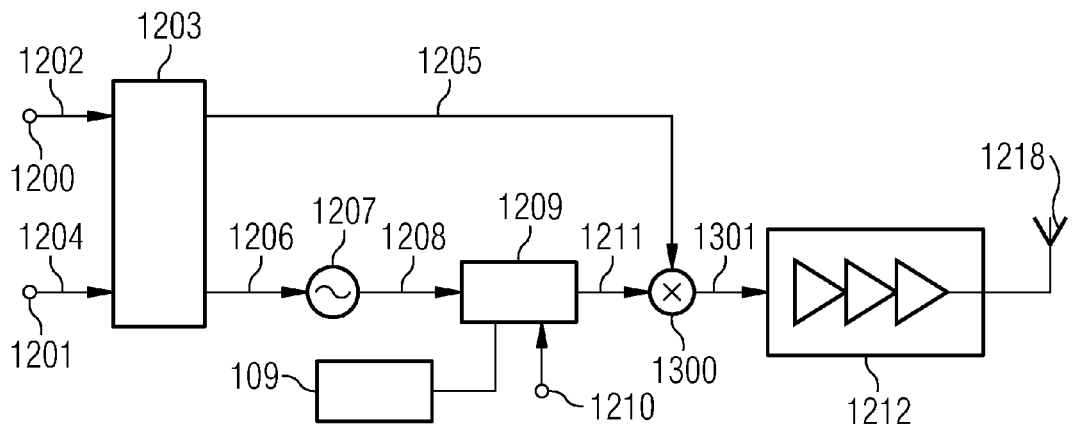
FIG. 13 shows a schematic illustration of a polar transmitter embodiment of the transmitting device.

FIG. 13 shows a schematic illustration of a polar transmitter embodiment of the transmitting device. Insofar as the embodiment shown in FIG. 13 has elements that act identically to those of the embodiment shown in FIG. 12, these elements are provided with the same reference symbols. In the same way as the polar modulator embodiment, the polar transmitter embodiment of the transmitting device has a first input 1200, a second input 1201, a first signal line 1202, a transformation unit 1203, a second signal line 1204, a third signal line 1205, a fourth signal line 1206. It furthermore has a phase modulator 1207, a fifth signal line 1208, a first signal shaper 1209, which is connected to a sequence generator 109, a third input 1210 and a sixth signal line 1211. These elements are connected to one another in the same way as in the polar modulator embodiment. The third signal line 1205 is coupled to a first mixer input of a multiplier 1300. The sixth signal line 1211 is coupled to a second mixer input of the multiplier 1300. In the multiplier 1300, the amplitude signal is thus modulated onto the modulated and noise-shaped phase signal provided on the sixth signal line 1211. Consequently, an amplitude- and phase-modulated signal is provided on a seventh signal line 1301 coupled to a mixer output of the multiplier 1300.

The multiplier 1300 is connected via the seventh signal line 1301 to a multistage amplifier unit 1212. In the latter, the amplitude- and phase-modulated signal is amplified to form an output signal. On the output side, the amplifier unit 1212 is connected to an antenna 1218.

The polar transmitter order of embodiment permits a simple implementation of a transmitting device. In the latter, provision can likewise be made of a reconstruction filter that shapes the spectrum of the output signal, in which it suppresses noise components. The amplifier unit 1212 can comprise analog amplifiers or switching amplifiers.

Figure 14:
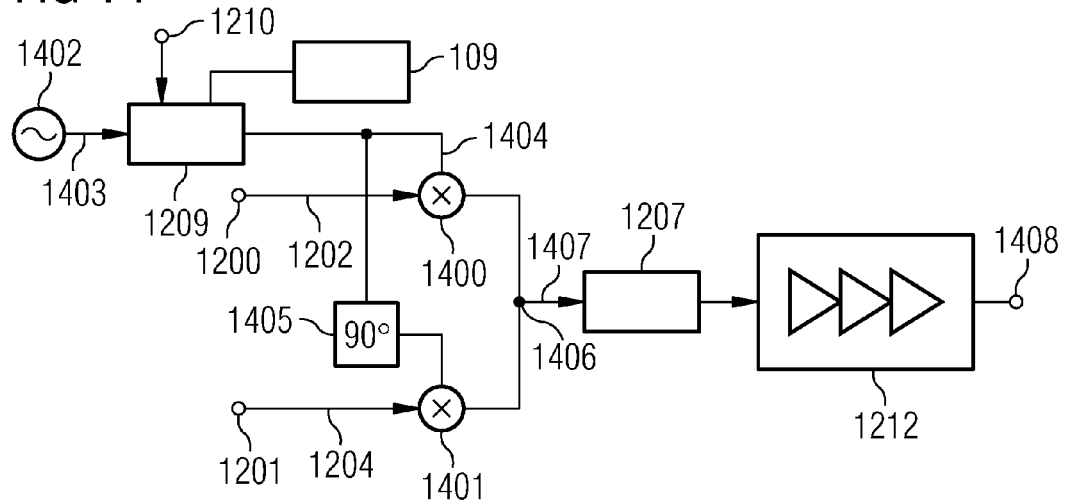
FIG. 14 shows a schematic illustration of a quadrature modulator embodiment of the transmitting device.

FIG. 14 shows a schematic illustration of a quadrature modulator embodiment of the transmitting device. The transmitting device has a first input 1200 for feeding in an in-phase component of a useful signal comprising an item of information to be transmitted. The transmitting device furthermore has a second input 1201 for feeding in a quadrature component of the useful signal. The quadrature-modulated input signals are provided by a baseband-processing device (not illustrated in FIG. 14). Said device comprises in various embodiments a microprocessor or a logic switching mechanism such as e.g. a micro-controller or DSP. The baseband-processing device can be arranged on the same semiconductor component as the transmitting device or separately. Different partitionings on different components are likewise conceivable.

The first input 1200 is connected to a first mixer element 1400 via a first signal line 1202. The second input 1201 is connected to a second mixer element 1401 via a second signal line 1204. A carrier frequency signal is generated in a local oscillator 1402. The local oscillator 1402 can be configured for example as a voltage-controlled oscillator, as a digital or analog phase-locked loop or in some other form. The local oscillator 1402 is connected to a first signal shaper 1209 via a third signal line 1403. The first signal shaper 1209 is connected to a sequence generator 109, which feeds a sequence signal to said signal shaper as described on the basis of the exemplary embodiments above. Said first signal shaper is furthermore connected to a third input 1210. A power information signal is provided at the third input 1210. In a manner dependent on the power information signal, the first signal shaper 1209 carries out noise shaping of the carrier frequency signal to form a second signal, which has noise components in at least one frequency range away from the carrier frequency. The second signal is provided on a fourth signal line 1404 by the first signal shaper 1209.

The first signal shaper 1209 is connected to the first mixer element 1400 via the fourth signal line 1404. The first signal shaper 1209 is connected to the second mixer element 1401 via the fourth signal line 1404 and a phase shifter 1405. The phase shifter 1405 shifts the phase of the second signal by a phase of 90° or Pi/2. The outputs of the first mixer element 1400 and of the second mixer element 1401 are combined at a node 1406 and are connected to a fifth signal line 1407. In this way, a quadrature modulator is provided in which the useful signal is modulated onto a carrier frequency signal. In this case, the carrier frequency signal is spectrally altered by the first signal shaper 1209 to form the second signal in such a way that it has not only spectral components on the carrier frequency but also spectral components in a frequency range away from the carrier frequency. The modulated useful signal provided on the fifth signal line 1407 correspondingly has spectral components in the frequency range.

The fifth signal line 1407 is connected to an amplifier unit 1212 via a second unit shaper 1217. The second signal shaper 1217 is configured as a band-pass filter, for example, which has a midband frequency at or in the vicinity of the carrier frequency. The second signal shaper 1217 suppresses at least signal components of the third signal in the frequency range away from the carrier frequency. The second signal shaper 1217 can also be referred to as a "reconstruction filter". It can be dispensed with given a suitable choice of sequence signal. It is connected to an amplifier unit 1212, which is connected to an output 1408. In this way, the spectrally filtered, amplified and modulated useful signal is provided for feeding into a transmission channel at the output 1408 of the transmitting device.

In contrast to the two embodiments shown previously, the quadrature modulator embodiment shown has in the signal path an arrangement of the second signal shaper 1217 upstream of the amplifier unit 1212. This is particularly advantageous if the amplifier unit has analog, that is to say linear, amplifiers. It goes without saying, however, that the measures implemented in the various embodiments can also be combined as required to form other embodiments. This concerns for example the use and the arrangement of the second signal shaper 1217, the embodiment of the amplifier unit 1212, and also the embodiment of the transmitting device for a wire-based or wireless transmission channel.

Figure 15:
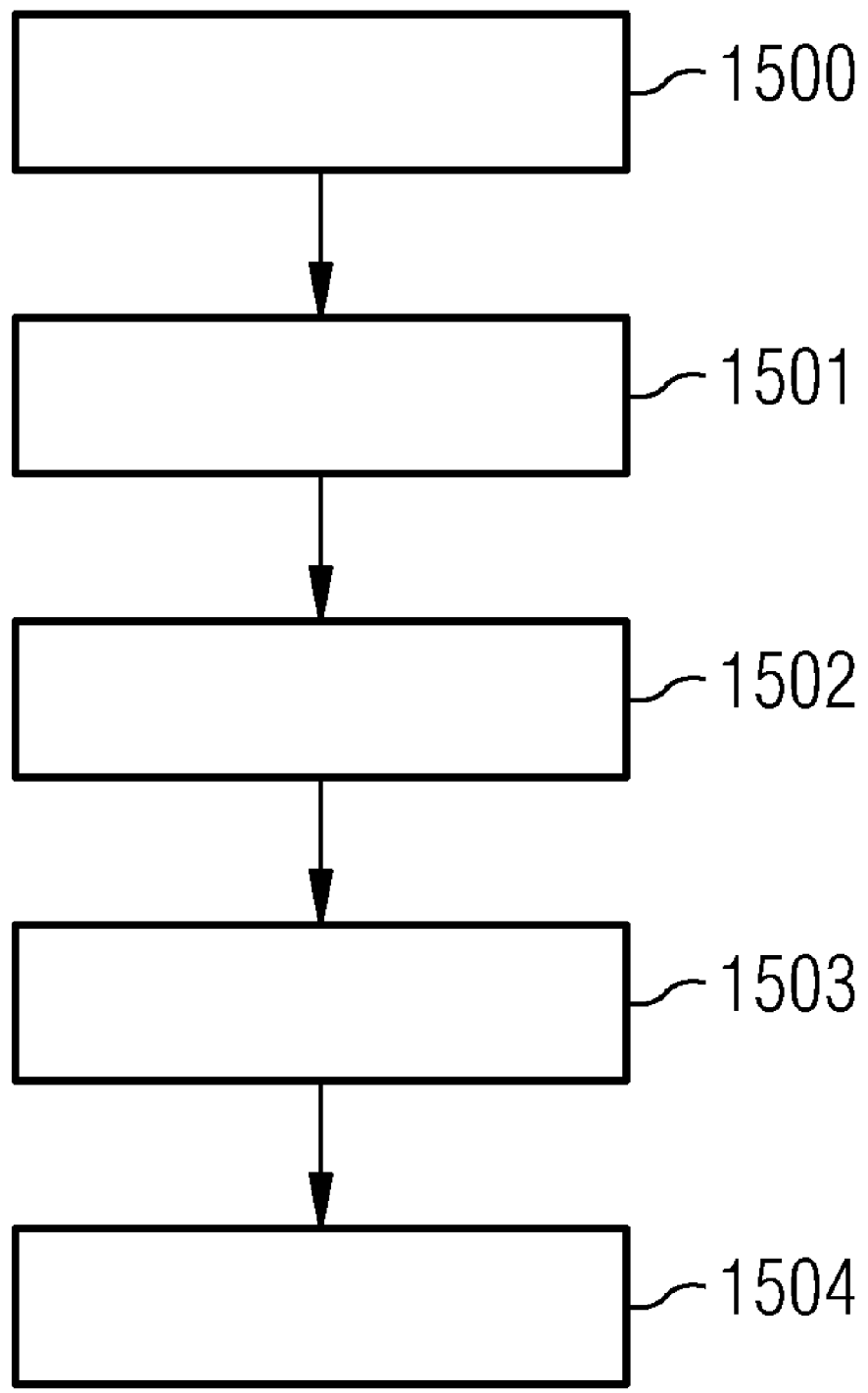
FIG. 15 shows a schematic illustration of an embodiment of the method according to the present disclosure.

FIG. 15 shows a schematic illustration of an embodiment of the method according to the present disclosure. In the method for generating a transmission signal, a first method step 1500 involves generating a first signal with a first frequency spectrum, which has a carrier frequency. A second method step 1501 involves providing a power information signal, which represents information about a signal level of the transmission signal. A third method step 1502 involves providing a sequence signal. A fourth method step 1503 involves noise shaping of the first signal in a manner dependent on the power information signal and the sequence signal to form a second signal. The second signal has noise components in at least one frequency range away from the carrier frequency. The second signal can subsequently be amplified. Beforehand or afterward, the noise components of the second signal can be suppressed. This is done for example by means of a band-pass filtering of the second signal. A fifth method step 1504 involves providing the second signal as transmission signal.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as preferred forms of implementing the claims. The specific features and acts described herein and variations of these specific features and acts may be implemented separated or may be combined.

The invention claimed is:

1. A method for the noise shaping of a transmission signal, comprising:
   generating a first signal with a first frequency spectrum;
   providing a power information signal, which represents information about a signal level of a transmission signal;
   providing a sequence signal according to a desired spectral mask;
   noise shaping the first signal dependent on the power information signal and the sequence signal to form a second signal, the noise shaping including shifting components of the first signal from the carrier frequency of the first signal into a sideband of the carrier frequency, wherein the second signal complies with the desired spectral mask; and
   providing the second signal as transmission signal.

2. The method as claimed in claim 1, comprising:
   generating the sequence signal from a random number sequence.

3. The method as claimed in claim 2, wherein the random number sequence represents white noise.

4. The method as claimed in claim 2, wherein the random number sequence has a memory.

5. The method as claimed in claim 2, further comprising adding the sequence signal to the first signal.

6. The method as claimed in claim 2, comprising:
   generating the power information signal dependent on an additional item of information to be transmitted.

7. The method as claimed in claim 2, wherein the noise shaping is performed by a delta-sigma modulator.

8. A device for generating a transmission signal comprising:
   a signal generator for generating a first signal with a first frequency spectrum, wherein the first frequency spectrum includes a carrier frequency;
   a power control unit for providing a power information signal, which represents a signal level of the transmission signal;
   a sequence generator for providing a sequence signal according to a desired spectral mask;
   a first signal shaper configured to noise shape the first signal dependent on the power information signal and the sequence signal to form a second signal, which shifts power components of the first signal from the carrier frequency into a sideband of the carrier frequency at least one frequency range away from the carrier frequency; and
   a signal output for providing the second signal as transmission signal.

9. The device as claimed in claim 8, comprising:
   an adder configured to add the sequence signal to the first signal.

10. The device as claimed in claim 8, wherein the first signal shaper includes a delta-sigma modulator.

11. The device as claimed in claim 8, wherein the sequence generator comprises a random number generator.

12. The device as claimed in claim 11, wherein the random number generator generates pseudo-random numbers.

13. The device as claimed in claim 11, wherein the sequence generator further comprises a scaling unit configured to scale numbers generated by the random number generator.

14. The device as claimed in claim 11, wherein the sequence generator further includes a circuit for impressing a memory term on the sequence signal.

* * * * *